(12) United States Patent
Bjork et al.

(10) Patent No.: US 11,547,257 B2
(45) Date of Patent: Jan. 10, 2023

(54) VACUUM BAG WITH INLET GASKET AND CLOSURE SEAL

(71) Applicant: DUSTLESS DEPOT, LLC, Price, UT (US)

(72) Inventors: Kyle Bjork, Buffalo, MN (US); Kendall Hansen, Price, UT (US)

(73) Assignee: DUSTLESS DEPOT, LLC, Price, UT (US)

( * ) Notice: Subject to any disclaimer, the term of this patent is extended or adjusted under 35 U.S.C. 154(b) by 400 days.

(21) Appl. No.: 16/781,935

(22) Filed: Feb. 4, 2020

(65) Prior Publication Data

US 2021/0235948 A1 Aug. 5, 2021

(51) Int. Cl.
| | | |
|---|---|---|
| B01D 46/00 | (2022.01) | |
| A47L 9/14 | (2006.01) | |
| B01D 46/02 | (2006.01) | |
| A47L 5/36 | (2006.01) | |

(52) U.S. Cl.
CPC ........... *A47L 9/1418* (2013.01); *A47L 9/1436* (2013.01); *B01D 46/02* (2013.01); *A47L 5/362* (2013.01); *B01D 2271/02* (2013.01); *B01D 2279/55* (2013.01)

(58) Field of Classification Search
CPC ...... A47L 9/1418; A47L 9/1436; A47L 5/362; A47L 9/1445; B01D 46/02; B01D 2271/02; B01D 2279/55; B01D 47/06
See application file for complete search history.

(56) References Cited

U.S. PATENT DOCUMENTS

| | | | |
|---|---|---|---|
| 1,458,720 A | 6/1923 | Malone | |
| 2,122,179 A | 6/1938 | Leathers | |
| 2,242,278 A | 5/1941 | Yonkers | |
| 2,626,418 A | 1/1953 | Kelly et al. | |
| 2,792,910 A | 5/1957 | Redniss | |
| 3,349,363 A | 10/1967 | Goodman | |
| 3,373,545 A | 3/1968 | Christianson | |
| 3,425,192 A | 2/1969 | Davis | |
| 3,432,998 A * | 3/1969 | Downey | A47L 9/1454 55/377 |
| 3,443,364 A | 5/1969 | Saltsman | |

(Continued)

FOREIGN PATENT DOCUMENTS

| | | |
|---|---|---|
| CN | 202933598 | 5/2016 |
| DE | 4138223 | 2/1993 |

(Continued)

OTHER PUBLICATIONS

Hearth Country filter 2009 from http://www.hearthcounrty.com/Accessories.html.

(Continued)

*Primary Examiner* — Dung H Bui
(74) *Attorney, Agent, or Firm* — Brett Peterson

(57) ABSTRACT

A vacuum filter bag includes an inlet flange and gasket and a plug. The inlet flange includes axial ribs and recesses which improve the seal between the inlet gasket and a vacuum inlet port and prevent accidental removal of the filter bag from the vacuum inlet port. The plug more securely closes the filter inlet opening after use of the filter bag. The filter bag reduces user exposure to dust and debris captured with a vacuum and is particularly suited for minimizing exposure to hazardous materials.

20 Claims, 12 Drawing Sheets

(56) References Cited

U.S. PATENT DOCUMENTS

| | | | |
|---|---|---|---|
| 3,568,413 A | 3/1971 | Jerabek | |
| 3,653,190 A | 4/1972 | Lee et al. | |
| 3,803,815 A * | 4/1974 | Anderson | A47L 9/1454 |
| | | | 55/377 |
| 3,853,517 A | 12/1974 | Mitchell | |
| 3,855,951 A | 12/1974 | Giles | |
| 3,870,486 A | 3/1975 | Eriksson et al. | |
| 3,902,601 A | 9/1975 | Townley | |
| 3,933,451 A * | 1/1976 | Johansson | A47L 9/1445 |
| | | | 55/367 |
| 3,955,236 A | 5/1976 | Mekelburg | |
| 3,960,734 A | 6/1976 | Zagorski | |
| 3,969,096 A | 7/1976 | Richard | |
| 4,007,026 A | 2/1977 | Groh | |
| 4,116,156 A | 9/1978 | Draxler | |
| 4,274,847 A | 6/1981 | Crener | |
| 4,279,627 A | 7/1981 | Paul et al. | |
| 4,329,161 A | 5/1982 | Osborn | |
| 4,345,353 A | 8/1982 | Sommerfeld | |
| 4,357,729 A | 11/1982 | Vander Molen et al. | |
| 4,373,228 A | 2/1983 | Dyson | |
| 4,399,638 A | 8/1983 | Rodowsky, Jr. et al. | |
| 4,467,494 A | 8/1984 | Jones | |
| 4,469,498 A * | 9/1984 | Fish | A47L 9/1436 |
| | | | 55/467 |
| 4,541,934 A | 9/1985 | Hakola | |
| 4,557,738 A | 12/1985 | Menasian | |
| 4,557,739 A | 12/1985 | Fortman et al. | |
| 4,585,466 A | 4/1986 | Syred et al. | |
| 4,592,764 A | 6/1986 | Ikezaki et al. | |
| 4,618,352 A | 10/1986 | Nelson | |
| 4,636,301 A | 1/1987 | Laramore | |
| 4,789,476 A | 12/1988 | Schulz | |
| 4,861,357 A * | 8/1989 | Gavin | A47L 9/1436 |
| | | | 55/374 |
| 4,868,949 A | 9/1989 | Loveless et al. | |
| 4,921,510 A | 5/1990 | Plooy | |
| 5,039,324 A * | 8/1991 | Goldberg | A47L 9/1454 |
| | | | 55/374 |
| 5,045,099 A * | 9/1991 | Goldberg | A47L 9/1445 |
| | | | 55/367 |
| 5,090,083 A | 2/1992 | Wulff | |
| 5,099,544 A | 3/1992 | Yamamoto et al. | |
| 5,120,983 A | 6/1992 | Sämann | |
| 5,194,077 A | 3/1993 | Bargiel et al. | |
| 5,223,005 A | 6/1993 | Avondoglio | |
| 5,226,941 A * | 7/1993 | Uibel | A47L 9/1445 |
| | | | 55/377 |
| 5,259,087 A | 11/1993 | Loveless et al. | |
| 5,322,534 A | 6/1994 | Kaiser | |
| 5,472,460 A | 12/1995 | Schmierer | |
| 5,472,465 A | 12/1995 | Schmierer | |
| 5,558,697 A | 9/1996 | Dyson et al. | |
| 5,584,900 A | 12/1996 | Zaiser et al. | |
| 5,598,039 A | 1/1997 | Weber | |
| 5,603,740 A | 2/1997 | Roy | |
| 5,606,767 A | 3/1997 | Crlenjak et al. | |
| 5,615,107 A | 3/1997 | DeAngelis | |
| 5,668,535 A | 9/1997 | Hendrix et al. | |
| 5,690,710 A | 11/1997 | Stephan | |
| 5,704,956 A | 1/1998 | Loveless et al. | |
| 5,725,619 A | 3/1998 | Brule et al. | |
| 5,747,973 A | 5/1998 | Robitaille et al. | |
| 5,771,844 A | 6/1998 | Dietz | |
| 5,783,086 A | 7/1998 | Scanlon | |
| 5,792,224 A | 8/1998 | Fu et al. | |
| 5,951,746 A | 9/1999 | Treitz et al. | |
| 5,954,863 A | 9/1999 | Loveless et al. | |
| 5,955,791 A | 9/1999 | Irlander | |
| 6,033,451 A * | 3/2000 | Fish | A47L 9/1427 |
| | | | 55/377 |
| 6,044,519 A | 4/2000 | Hendrix | |
| 6,081,961 A | 7/2000 | Wang | |
| 6,156,086 A | 12/2000 | Zhang | |
| 6,261,331 B1 | 7/2001 | Fleurier et al. | |
| 6,334,881 B1 | 1/2002 | Giannetta et al. | |
| 6,347,985 B1 | 2/2002 | Loveless | |
| 6,379,408 B1 * | 4/2002 | Embree | A47L 9/1445 |
| | | | 55/369 |
| 6,461,394 B1 | 10/2002 | Mattsson | |
| 6,540,918 B2 | 4/2003 | Gil et al. | |
| 6,626,969 B1 * | 9/2003 | Steele | A47L 9/1436 |
| | | | 55/374 |
| 6,638,344 B2 | 10/2003 | Horton et al. | |
| 6,746,500 B1 | 6/2004 | Park et al. | |
| 6,786,947 B2 | 9/2004 | Mountford | |
| 6,833,016 B2 | 12/2004 | Witter | |
| 6,860,799 B2 | 3/2005 | Loveless | |
| 6,886,215 B2 * | 5/2005 | Dodson | A47L 9/1436 |
| | | | 15/350 |
| 6,949,130 B1 | 9/2005 | Grey | |
| 6,997,653 B2 | 2/2006 | Styles | |
| 7,082,640 B2 | 8/2006 | McCutchen | |
| 7,115,151 B2 | 10/2006 | Smithies et al. | |
| 7,246,406 B2 | 7/2007 | Yarbrough | |
| 7,287,301 B2 | 10/2007 | Marshall et al. | |
| RE40,048 E | 2/2008 | Witter | |
| 7,341,612 B2 | 3/2008 | Nhan et al. | |
| 7,445,655 B2 | 11/2008 | Bock et al. | |
| 7,485,167 B2 | 2/2009 | Kennedy | |
| 7,673,369 B2 | 3/2010 | Gogel | |
| 7,736,406 B2 | 6/2010 | Kuroki | |
| 7,752,708 B2 | 6/2010 | Gogel et al. | |
| 7,785,381 B2 | 8/2010 | Oh et al. | |
| 7,805,805 B2 | 10/2010 | Loveless | |
| 7,845,046 B2 | 12/2010 | Milligan et al. | |
| 7,867,304 B2 | 1/2011 | Stewen et al. | |
| 7,908,707 B2 | 3/2011 | Yacobi et al. | |
| 8,002,940 B2 * | 8/2011 | Pierre | A61F 7/02 |
| | | | 156/290 |
| 8,011,398 B2 | 9/2011 | Loveless | |
| 8,133,094 B2 | 3/2012 | Loveless | |
| 8,137,165 B2 | 3/2012 | Loveless | |
| 8,177,606 B2 | 5/2012 | Loveless | |
| 8,206,482 B2 | 6/2012 | Williams | |
| 8,381,711 B2 | 2/2013 | Loveless | |
| 8,438,700 B2 | 5/2013 | Makarov et al. | |
| 8,523,637 B2 | 9/2013 | Loveless | |
| 8,561,512 B2 | 10/2013 | Loveless | |
| 8,607,408 B2 | 12/2013 | Herrett | |
| 8,656,551 B2 | 2/2014 | Duncan | |
| 8,695,157 B2 | 4/2014 | Beskow | |
| 8,702,478 B2 | 4/2014 | Loveless et al. | |
| 8,978,781 B2 | 3/2015 | Burdick et al. | |
| 9,038,236 B2 | 5/2015 | Fry et al. | |
| 9,038,275 B2 | 5/2015 | Jensen et al. | |
| 9,161,667 B2 | 10/2015 | Sobel | |
| 9,198,552 B2 | 12/2015 | Wolfe | |
| 9,532,689 B2 | 1/2017 | Westbrook | |
| D816,453 S | 5/2018 | Hansen et al. | |
| 2001/0005983 A1 | 7/2001 | Berfield et al. | |
| 2002/0020155 A1 * | 2/2002 | Stokmans | A47L 9/1436 |
| | | | 55/374 |
| 2002/0185869 A1 | 12/2002 | Lin | |
| 2003/0175475 A1 | 9/2003 | Higgins | |
| 2003/0182908 A1 * | 10/2003 | Zimet | B01D 46/02 |
| | | | 55/374 |
| 2004/0045119 A1 | 3/2004 | Ponjican et al. | |
| 2004/0060145 A1 | 4/2004 | Hayama et al. | |
| 2004/0250683 A1 | 12/2004 | Soane | |
| 2004/0255783 A1 | 12/2004 | Graham | |
| 2005/0055794 A1 | 3/2005 | Marshall | |
| 2005/0193696 A1 | 9/2005 | Muller et al. | |
| 2005/0274094 A1 | 12/2005 | DeMarco | |
| 2006/0060085 A1 | 3/2006 | Ptak | |
| 2006/0100796 A1 | 5/2006 | Fraden et al. | |
| 2006/0292924 A1 | 12/2006 | Spiri et al. | |
| 2007/0095031 A1 * | 5/2007 | Zahuranec | A47L 9/1436 |
| | | | 55/374 |
| 2007/0174993 A1 | 8/2007 | Dever et al. | |
| 2007/0226953 A1 | 10/2007 | Ohtsu et al. | |

(56) References Cited

U.S. PATENT DOCUMENTS

| | | | |
|---|---|---|---|
| 2007/0266680 A1* | 11/2007 | Schmierer | A47L 9/1427 55/374 |
| 2008/0099053 A1 | 5/2008 | Loveless | |
| 2008/0109986 A1 | 5/2008 | Loveless | |
| 2008/0110400 A1 | 5/2008 | Satou | |
| 2008/0146125 A1 | 6/2008 | Loveless | |
| 2008/0220714 A1 | 9/2008 | Caruso | |
| 2009/0050578 A1 | 2/2009 | Israel | |
| 2009/0056294 A1 | 3/2009 | McCutchen | |
| 2009/0119870 A1 | 5/2009 | Nilsson | |
| 2009/0181604 A1 | 7/2009 | Loveless | |
| 2009/0181605 A1 | 7/2009 | Loveless | |
| 2009/0181606 A1 | 7/2009 | Loveless | |
| 2009/0183377 A1 | 7/2009 | Loveless | |
| 2009/0183800 A1 | 7/2009 | Loveless | |
| 2009/0186559 A1 | 7/2009 | Loveless | |
| 2009/0241283 A1 | 10/2009 | Loveless | |
| 2009/0266048 A1 | 10/2009 | Schwarz | |
| 2010/0005619 A1 | 1/2010 | Loveless | |
| 2010/0223759 A1 | 9/2010 | Baik | |
| 2010/0285729 A1 | 11/2010 | Loveless | |
| 2010/0313867 A1 | 12/2010 | Loveless | |
| 2011/0021121 A1 | 1/2011 | Loveless | |
| 2011/0079207 A1 | 4/2011 | Guth | |
| 2011/0094052 A1 | 4/2011 | Witter | |
| 2011/0192262 A1 | 8/2011 | Loveless | |
| 2011/0266213 A1 | 11/2011 | Jo | |
| 2012/0090640 A1 | 4/2012 | Rentschler et al. | |
| 2012/0151705 A1 | 6/2012 | Herndon et al. | |
| 2012/0151710 A1 | 6/2012 | Yarbrough | |
| 2012/0192480 A1 | 8/2012 | Barrett | |
| 2012/0211625 A1* | 8/2012 | Schultink | A47L 9/1454 248/311.2 |
| 2012/0234748 A1 | 9/2012 | Little | |
| 2012/0317944 A1 | 12/2012 | Lise | |
| 2013/0032359 A1 | 2/2013 | Riggs | |
| 2013/0139691 A1 | 6/2013 | Goldbach et al. | |
| 2013/0199137 A1 | 8/2013 | Hallgren et al. | |
| 2013/0209181 A1 | 8/2013 | Arsdale | |
| 2013/0263406 A1 | 10/2013 | Amisani et al. | |
| 2013/0276262 A1 | 10/2013 | Wolfe et al. | |
| 2014/0215752 A1 | 8/2014 | Loveless | |
| 2014/0237763 A1 | 8/2014 | Holsten et al. | |
| 2014/0311107 A1 | 10/2014 | Sobel | |
| 2016/0184963 A1 | 6/2016 | Melancon | |
| 2017/0035262 A1 | 2/2017 | Li et al. | |
| 2017/0144096 A1 | 5/2017 | Chen | |
| 2018/0071845 A1 | 3/2018 | Hansen et al. | |
| 2019/0125153 A1 | 5/2019 | Loveless | |
| 2019/0208973 A1* | 7/2019 | Werius | A47L 9/1427 |
| 2020/0323407 A1* | 10/2020 | Bjork | B01D 46/0005 |

FOREIGN PATENT DOCUMENTS

| | | |
|---|---|---|
| DE | 10101218 | 1/2001 |
| DE | 102008017575 A1 | 10/2009 |
| DE | 102011008117 A1 | 4/2012 |
| DE | 202013100862 U1 | 3/2013 |
| DE | 102013101992 A1 | 8/2014 |
| DE | 202016100890 U1 | 3/2016 |
| DE | 102015104624 A1 | 9/2016 |
| DE | 202016106293 U1 | 12/2016 |
| EP | 0269592 | 6/1988 |
| EP | 0284184 | 9/1988 |
| EP | 0542035 | 10/1992 |
| EP | 0728435 | 8/1996 |
| EP | 1173086 | 11/2000 |
| EP | 1299023 | 11/2004 |
| EP | 1629762 | 10/2007 |
| JP | S5498053 A | 8/1979 |
| JP | S54154165 A | 12/1979 |
| JP | 2009 082542 | 4/2009 |
| WO | WO 8502528 | 6/1985 |
| WO | WO 2005/053497 | 6/2005 |
| WO | WO 2008/102237 | 8/2008 |
| WO | WO 2009/031961 | 3/2009 |

OTHER PUBLICATIONS

Hearth Counrty main 2009 from http://www.hearthcountry.com/Home.html.
NorthlineExpress Apr. 4, 2016 from https://www.northlineexpress.com/hearth-counrty-ash-vacuum-aw400-292.html.
Woodland Direct Feb. 18, 2011 from https://web.archive.org/web/20110218011258/http://woodlanddirect.com/Fireplace-Accessories/Fireplace-Ash-Vacuums/Hearth-Counrty-Ash-Vac?.
DE 202016106293-ENG (Espacenet machine translation of DE 202016106293, Branofilter GmbH, year 2016).

* cited by examiner

VACUUM BAG WITH INLET GASKET AND CLOSURE SEAL

THE FIELD OF THE INVENTION

The present invention relates to vacuum bags. In particular, examples of the present invention relates to a vacuum bag with an improved inlet gasket and a closure seal for closing a vacuum bag after use and preventing debris from exiting the used vacuum bag.

BACKGROUND

Vacuums are commonly used to clean up dust and debris. As a vacuum moves a substantial amount of air in order to entrain and capture dust and debris, it requires adequate filtration to remove the dust from the air. As people become increasingly aware of the health hazards of many airborne particulates, there is an increasing demand for vacuums and vacuum filters which are better able to capture and retain dust and thereby minimize exposure to the dust.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
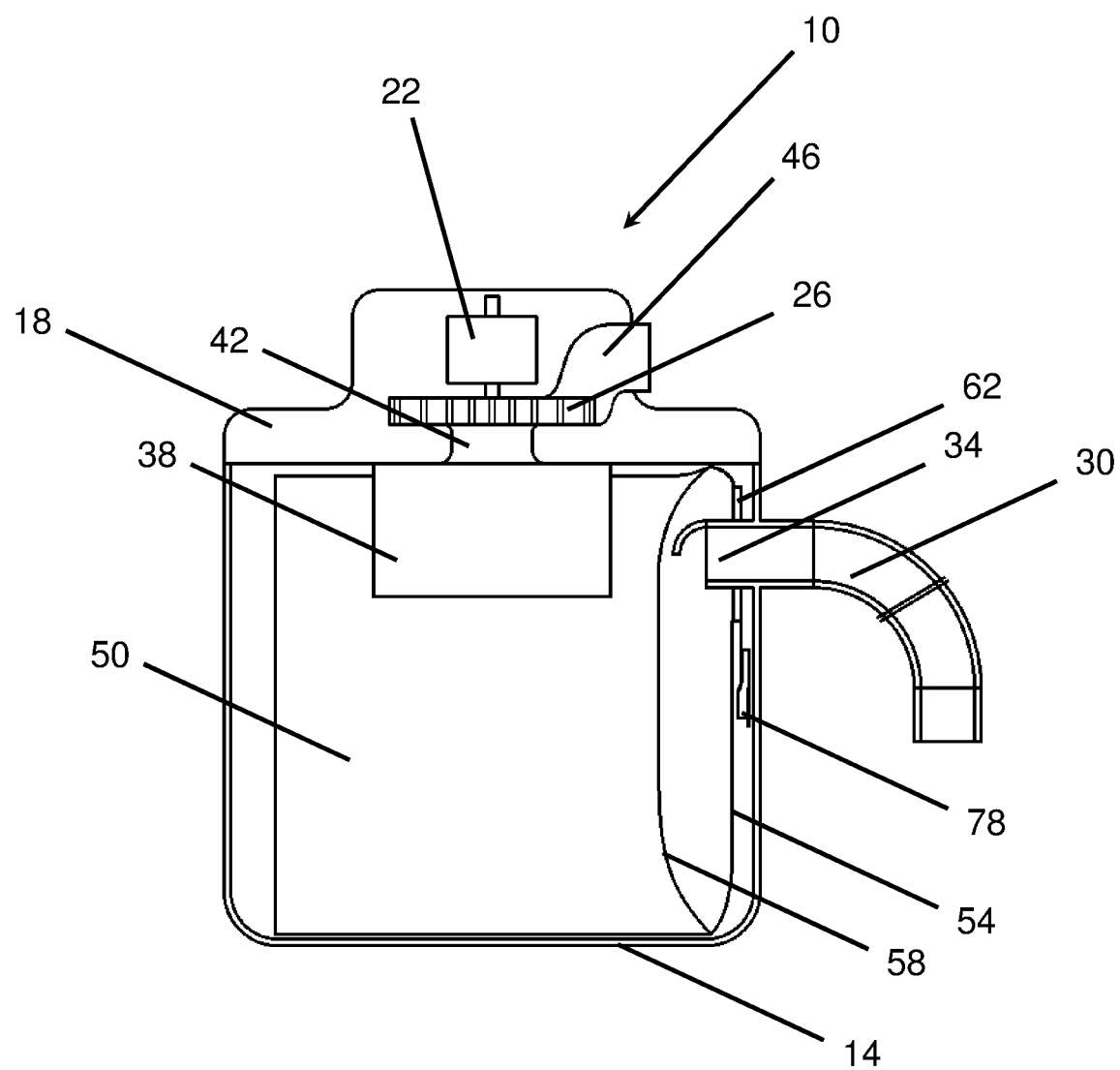
FIG. 1 is a schematic drawing which shows a vacuum and filter bag.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in a figure in order to facilitate a less obstructed view of the features or embodiments which are depicted.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

The disclosure describes a vacuum filter. Particularly, the present disclosure describes a vacuum filter for vacuums such as canister vacuums with an inlet gasket that more securely attaches the filter to the vacuum inlet and a plug which closes the filter opening after use of the filter. The inlet gasket improves the seal between the filter inlet and the vacuum inlet and prevents debris from escaping the filter. The inlet gasket also grips the vacuum inlet securely and prevents the filter from becoming detached from the vacuum canister inlet during use. The plug closes the filter inlet and prevents loss of particulate matter or other collected debris through the filter opening after use of the vacuum filter.

Vacuums, including portable canister vacuums (e.g. shop vacuums), are commonly used to collect debris. The debris varies significantly and may include ordinary dirt and household dust, construction debris such as sheetrock dust, and hazardous debris such as stone or masonry debris, fibrous minerals, or lead based paint. As people become increasingly aware of the health hazards of airborne particulates, there is a greater desire to minimize exposure to dust and debris. For ordinary household debris, there is often a desire to minimize mess while changing vacuum bags. For construction and industrial work, there is a need to safeguard workers from prolonged exposure to dust which is generated during construction work. Accordingly, canister vacuums or other similar vacuums are becoming commonly used for cleanup and also to capture the dust and debris generated from power tools.

Wood dust from sanding and cutting wood has been recognized as harmful and many workers desire to capture wood dust as it is generated. Dust from cutting and grinding stone or cement products is typically harmful and should be captured. Debris from various industrial processes is hazardous and needs to be collected to ensure the safety of the worker as well as to comply with requirements regarding containment, disposal, and worker safety. For example, removal of popcorn ceiling, leaded paint, or other industrial coatings and insulation generates hazardous debris and the workers should not be exposed to the debris. Vacuums may be connected to power tool dust shrouds to directly collect the dust as it is generated at the power tool and minimize dust which escapes into the work area. Vacuums are often used to capture any other dust and debris encountered during the work.

For dust collection with a vacuum to be successful, the integrity of the filtration system must be maintained. Applicants have discovered that existing vacuum filters are prone to several modes of failure and are inadequate for collection of hazardous materials. Vacuum bag inlet gaskets may stretch out of the plane of the filter inlet while they are installed over the vacuum canister inlet; resulting in the inlet gasket not seating fully on the vacuum inlet. This tends to happen to both thick and thin inlet gaskets as thinner inlet gaskets stretch more easily out of plane and thicker inlet gaskets provide more resistance to radial stretching around the vacuum inlet. Existing filter inlet gaskets frequently provide insufficient resistance to falling off of the vacuum canister inlet. When the vacuum is used to collect heavy debris such as sheetrock dust or concrete dust, a significant amount of weight is accumulated in the vacuum filter bag. This dust is deposited throughout the bag filter media and the bag filter material is pulled down towards the bottom of the vacuum canister by the weight of the debris. This weight may pull the filter bag inlet gasket off of the vacuum inlet or compromise the inlet gasket seal. Many vacuum bags also provide closures which are insufficient for the collection of hazardous materials as they leak after removal of the bag from the vacuum. If this occurs, a worker may be exposed to hazardous materials and this debris is spread across a work area as the bag is removed from the vacuum and disposed of.

The present vacuum filter bag avoids these failures. The filter bag inlet gasket seats easily on the vacuum canister inlet while also resisting removal from the vacuum inlet. The inlet gasket provides a secure seal between the vacuum inlet which prevents debris from escaping. The vacuum filter bag provides a closure plug which is securely engaged by the inlet gasket and which prevents debris from exiting the filter bag as the filter bag is disposed of. The filter plug creates a positive seal at the inlet gasket and also resists subsequent opening of the filter bag inlet. The filter bag is highly effective at capturing nuisance and hazardous dust and debris and allows for capture and disposal of the debris without significant worker exposure. The filter bag is also effective at collecting and filtering debris laden non-flammable liquids.

Referring to FIG. 1, a schematic drawing of a vacuum 10 is shown. FIG. 1 is shown in cross-section and is simplified to more easily show the overall vacuum and filter components. Some necessary components, such as a vacuum power cord or power source are not shown for simplicity. A canister vacuum is shown as the example vacuum 10. Canister vacuums 10 typically have a debris canister 14, which often has a volume from 1 to 16 or more gallons, and a canister lid 18. The canister 14 may include feet or wheels on the bottom thereof to support the vacuum 10 and increase the portability of the vacuum. The canister lid 18 often houses the vacuum motor 22 and impeller/fan 26. Debris laden air moves through a vacuum hose 30, through a canister inlet port 34, and into the canister 14. Without a filter bag 50, the dirty air moves through a filter 38, a lid inlet 42, the motor fan 26, and out of the vacuum 10 through an exhaust opening 46 in the lid 18. The filter 38 is used to remove debris which is entrained in the moving air and trap the debris in the vacuum canister 14 so that clean air flows out of the vacuum 10. The filter 38 is commonly cylindrical or conically shaped and may attach to the vacuum canister lid 18 so that any air passing through the vacuum impeller 26 also passes through the filter 38.

A bag filter 50 is attached to the canister inlet 34 to improve the filtration ability of the vacuum 10. Accordingly, air flows through the hose 30 and into the bag filter 50, through the bag filter 50, through the filter 38, and out of the vacuum 10. Often, the bag filter 50 captures the majority of the dust and debris and the cylindrical filter 38 provides final HEPA filtration of the air stream. The use of a bag filter 50 is advantageous when the vacuum 10 is used to capture fine dust as it provides a significantly larger filter area than a cylindrical filter 38 and is not easily clogged. Accordingly, airflow through the vacuum is maintained throughout the cleaning process. The bag filter 50 also keeps the cylindrical filter 38 from clogging and significantly prolongs its lifespan. The bag filter 50 is particularly advantageous for collecting hazardous dust such as fiberglass, sheetrock dust, cement dust, debris containing asbestos, silica, or lead, and other construction dusts. As people become more aware of the harmful effects of breathing dusts, more people desire to minimize their exposure to airborne dusts. Without a bag filter 50, larger debris collects in the canister 14 while the fine dust collects on the cylindrical filter 38. The vacuum 10 is emptied by removing the lid 18, dumping out the canister 14, and removing the filter 38. The filter 38 may be disposed of or, in some cases, may be cleaned and reused. Emptying the vacuum canister 14 and removing or cleaning the filter 38 expose the user to significant amounts of the collected dust and allow dust to escape into the environment. This is particularly undesirable where the dust contains hazardous materials. The use of a bag filter 50 solves many of these problems as the dust is captured in the bag filter 50. The vacuum canister 14 and the canister filter 38 largely remain clean.

Previous bag filters suffer from drawbacks which expose the user to dust. Existing vacuum bag filters typically have a thin rubber inlet gasket. The gasket is flat rubber with a hole which is smaller than the vacuum inlet. In some cases, vacuum bag filters fall off of the canister inlet 34 during use. Where heavy debris such as sheetrock or concrete dust is collected in the vacuum, the weight of the debris in the filter bag may pull the filter inlet flange off of the vacuum inlet 34. If this happens, dust bypasses the filter bag and collects outside of the bag in the vacuum canister, on the outside of the vacuum bag filter, and on the canister filter 38. If a canister filter 38 is not used with the bag filter, unfiltered air passes through the vacuum motor and out of the vacuum where it is aerosolized by the vacuum. Emptying and cleaning the vacuum 10 then exposes the user to a significant amount of dust.

Even if the bag filter does not fail during use, a significant amount of dust may be expelled out the inlet of the bag filter as the bag is handled. Movement of the bag to remove it from the vacuum and deposit it in the garbage tends to pump air in and out of the vacuum bag. This air movement entrains dust from the filter bag and pumps dust out of the vacuum bag; exposing the user who is handling the bag to the dust as well as other persons who are in the area.

The present vacuum bag 50 addresses these problems by providing an improved inlet flange, inlet gasket, and plug. The inlet gasket secures the bag 50 to the vacuum inlet 34 during use and ensures that dust is properly collected in the filter bag 50. Once the filter bag is ready for disposal, the plug is used to close the inlet opening into the filter bag 50. The plug ensures that dust is not expelled out of the bag 50 while the bag is handled by the user.

Figure 2:
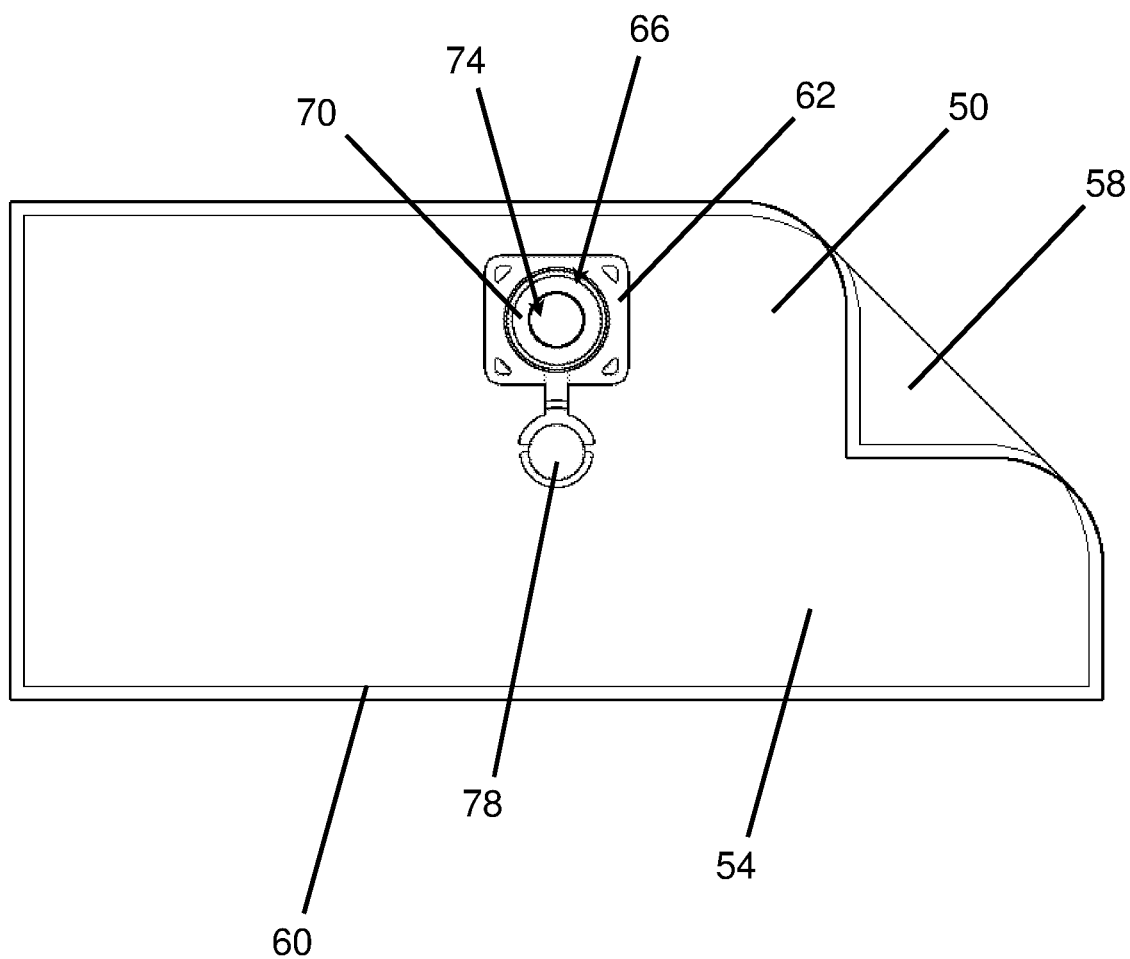
FIG. 2 is a front view drawing of the filter bag.

FIG. 2 shows a drawing of the filter bag 50. The filter bag 50 includes a front layer 54 and a back layer 58 of material. The front layer 54 and back layer 58 of material are part of the enclosed envelope of the filter bag. In many applications, the front layer 54 is a layer of filter media and the back layer 58 is a layer of filter media. Additionally, the front layer 54 and/or the back layer 58 may each be a composite structure which comprises multiple separate layers of filter material which together form the front wall 54 or back wall 58 of the filter bag 50. In some situations, either the front layer 54 or the back layer 58 may comprise filter media. In some vacuums 10, the air flow through a filter bag 50 is predominantly through one side or section of the filter bag 50 and the other sections of the filter bag 50 contribute little to the airflow. For example, most of the airflow through filter bags 50 in canister vacuums 10 is through the inside of the installed filter bag 50 (the back layer 58 of the filter bag) as the front layer 54 of the filter bag 50 is disposed against the wall of the canister 14 and the back layer 58 of the filter bag is disposed adjacent the cylindrical filter 38 or the motor inlet 42. Accordingly, the filter bag 50 may be formed with a front layer 54 of relatively impermeable material for greater strength or reduced cost and with a back layer 58 of filter media.

The filter media is typically a depth filtration media such as filter paper, filter cloth, or filter felt. The edges of the front layer 54 and back layer 58 of filter media are attached together around their perimeter 60 to form an envelope for collecting dust and debris. The filter bag 50 is closed other than the inlet opening 74 so that fluid flowing into the filter bag through the inlet opening must pass through the filter media to exit the filter bag. Filter bags 50 are often about 4 feet wide and about 1 and ½ feet tall; providing a significant amount of filter area. The filter bags 50 may often range between about 2 and about 5 feet wide and between about 1 and about 2 feet tall depending on the size of the vacuum canister 14. An inlet flange 62 (a filter mounting flange 62) is attached to the front layer 54 of filter media. The inlet flange 62 includes an opening 66 which is larger in diameter than the vacuum inlet 34. An inlet gasket 70 is attached to the opening 66 of the inlet flange 62. The inlet gasket 70 is coaxial with the flange opening 66 and extends inwardly into the flange opening 66. The inlet gasket 70 includes a smaller inlet opening 74 which is smaller in diameter than the vacuum inlet 34 and smaller in diameter than the inlet flange opening 66. For a vacuum with a nominal 2.25 inch vacuum hose 30, the inlet opening 74 may often be about 1.75 inches in diameter and the inlet gasket 70 may often have an outside diameter of about 2.75 inches. A corresponding filter media opening is located in the front layer 54 of filter media. The filter media opening may be circular. The filter media opening is larger than the gasket inlet opening 74 and is disposed in alignment with the inlet opening 74. The filter media opening allows the vacuum canister inlet 34 to pass through the inlet flange 62 and inlet gasket 70 and beyond the front layer 54 of filter media into the interior space of the filter bag 50 between the front layer 54 and back layer 58 of the filter bag so that dust and debris is deposited in the interior space of the filter bag 50. A plug 78 is attached to the inlet flange 62. The plug 78 is used to close the filter bag 50 after the filter bag 50 is full of debris. The plug 78 could be a separate structure.

FIG. 1 illustrates how the vacuum filter bag 50 is installed in the vacuum 10. The filter bag 50 has been unfolded and placed into the vacuum canister 14 in a circular or "C" shape around the vacuum canister perimeter when viewed from above. The filter bag 50 is typically placed so that the inlet flange 62 is near the top of the debris canister 14 adjacent the vacuum canister inlet 34. The front layer 54 of filter media is facing the outside of the vacuum canister 14 so that the inlet flange 62 is disposed on the outer side of the filter bag 50 adjacent the vacuum inlet 34. The filter inlet flange 62 is attached to the vacuum inlet 34 so that the vacuum inlet 34 extends through the inlet flange 62 and inlet gasket 70 and into the interior of the filter bag 50. The inlet gasket 70 seals against the canister inlet 34 so that debris laden air entering into the filter bag 50 via the vacuum hose 30 must pass through the filter media before exiting the vacuum 10.

Figure 3:
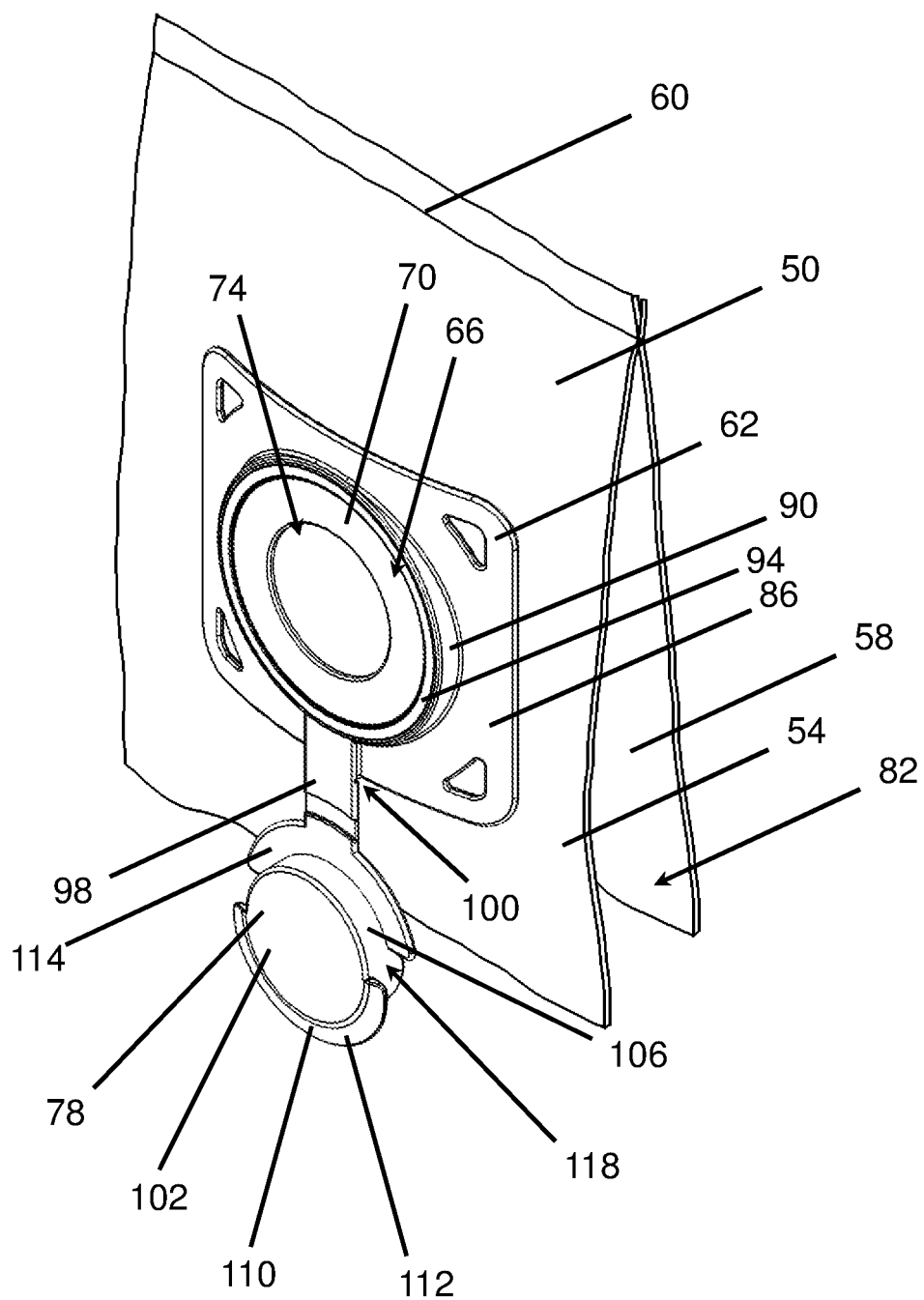
FIG. 3 is a perspective view drawing of a portion of the filter bag and inlet flange.

FIG. 3 shows a cut away drawing of the filter bag 50 and filter inlet flange 62. The drawing particular shows the inlet flange 62 and a portion of the top of the front layer 54 and back layer 58 of filter media. The front layer 54 and back layer 58 of filter media are joined together around the perimeter 60 of the bag to form an interior cavity 82 which collects dust and debris. The filter bag inlet flange 62 is attached to the outer face of the front layer 54 of the filter bag 50. The inlet flange 62 may be attached to the front layer 54 of the filter bag 50 by adhesive or thermal fusion depending on the materials used for the inlet flange 62 and the front layer 54.

The inlet flange 62 includes a rectangular mounting base 86 which secures the inlet flange 62 to the front layer 54 of filter media. For a filter bag used with a vacuum 10 with a 2.25 inch vacuum hose 30, the mounting base 86 is often between about 4 inches and about 6 inches wide and between about 4 inches and about 6 inches tall. The mounting base 86 is often about 0.05 inches thick and may often be between about 0.05 inches thick and about 0.1 inches thick. The mounting base 86 is curved about a vertical axis such that the sides of the mounting base 86 are curved towards the back layer 58 of filter media. Accordingly, the mounting base 86 has a convex exterior surface and a concave interior surface which is attached to the front layer 54 of filter media. The inlet gasket 70 is planar and the mounting base 86 includes a cylindrical wall 90 extending outwardly towards the inlet gasket 70 so that the sides of the inlet gasket 70 are separated from the curving sides of the mounting base 86. The arrangement of the curved mounting base 86 with the flat inlet gasket 70 allows the inlet gasket 70 to be installed further onto the canister inlet 34 for most vacuum canisters 14. This secures the inlet gasket 70 against accidental removal from the canister inlet 34. An attachment flange 94 is formed around opening 66 in the mounting base 86. The inlet gasket 70 is attached to the attachment flange 94 and is positioned in the opening 66 in the mounting base 86. The inlet gasket 70 is planar and annular in shape; having an outer perimeter attached to the mounting base 86 and a round inner opening 74 which receives the vacuum debris canister inlet 34.

In one example, the mounting base 86 is formed from a thermoplastic and the inlet gasket is formed from a thermoplastic elastomer. The mounting base 86 is relatively rigid while the inlet gasket is flexible and elastic.

A plug 78 is attached to the mounting base 86 by a flexible strap 98. The plug 78 is used to close the vacuum filter bag 50 after use. The flexible strap 98 is sufficiently flexible to allow the plug 78 to be pivoted upwardly to the gasket inlet opening 74 and to be placed into the inlet opening 74. The flexible strap 98 may include sections of reduced thickness in desired locations to facilitate bending. The flexible strap 98 includes a groove 100 formed halfway between the center of the inlet opening 74 and the center of the plug 78. The strap 98 is thin at the location of the groove 100 and this causes the strap to fold at the groove 100 and lessens bending at other locations along the length of the strap 98 when the plug 78 is inserted into the inlet gasket opening 74. The folding of the strap 98 at groove 100 helps the plug 78 to seat properly in the inlet opening 74 as it reduces any tendency of the strap 98 to unbend and pivot or otherwise move the plug 78 within the inlet opening 74.

The plug 78 and flexible strap 98 may be formed as a single unitary structure with the mounting base 86 by molding the mounting base 86, plug 78, and strap 98 together and the plug 78 may be formed from the same material as the mounting base 86. The plug 78 is generally cylindrical in shape with additional flanges attached to the cylindrical portion of the plug 78. The cylindrical portion of the plug 78 has a diameter which is greater than the diameter of the inlet opening 74 so that the inlet gasket 70 is stretched around and seals around the plug 78 when the plug is inserted into the inlet opening 74. The cylindrical portion of the plug 78 has a length which is greater than the thickness of the inlet gasket 70, and which may often be between about 2 times the thickness of the inlet gasket 70 and about 5 times the thickness of the inlet gasket 70. For molding convenience, the cylindrical portion of the plug 78 is hollow and includes a closed front face 102 and sidewall 106.

The plug 78 includes two flanges which each extend partially around the circumference of the plug. The flanges include a distal inner retaining lip 110 and a proximal outer flange 114. The distal inner retaining lip 110 is located around the distal half of the plug 78 (relative to the strap 98) and is located on or near the front face of the plug 78 when viewing the front of the inlet flange 62 as shown in FIG. 3. The distal inner retaining lip 110 is typically between about 0.2 inches and about 0.5 inches wide. A bevel 112 is formed on the front face of the inner retention lip 110 so that the front face of the inner retention lip 110 slopes away from the front face 102 of the plug 78. The bevel 112 makes it easier to insert the inner retention lip 110 into the filter inlet opening 74 to close the filter bag 50. The proximal outer flange 114 is located around the proximal half of the plug 78 (relative to the strap 98) and is located near the back of the plug 78 when the inlet flange 62 is viewed from the front as shown in FIG. 3. The proximal outer flange is typically between about 0.2 inches and about 0.5 inches wide. The inner retaining lip 110 and outer flange 114 are offset from each other relative to the length (thickness) of the plug 78. Accordingly, a space 118 around the circumference of the plug 78 is defined between the plane of the inner retaining lip 110 and the plane of the outer flange 114. The width of the circumferential space 118 between the plane of the inner retaining lip 110 and the plane of the outer flange 114 is approximately 3 times as thick as the inlet gasket, and may often be between about 2 times and about 5 times the thickness of the gasket 70.

When the plug 78 is pivoted upwardly towards the inlet gasket 70 to close the inlet opening 74, the inner retaining lip 110 is disposed towards the top of the filter bag 50 and is positioned towards the inside of the filter bag 50 relative to the length of the plug 78. The outer flange 114 is positioned towards the bottom of the filter bag 50 and is positioned towards the outside of the filter bag relative to the length of the plug 78. The plug 78 may be rotated slightly as the inner retaining lip 110 is inserted through the inlet opening 74. Inserting the plug 78 into the gasket 70 often requires some stretching of the gasket 70. Once the inner retaining lip 110 is passed through the inlet opening 74, the gasket 70 engages the plug 78 in the circumferential space 118 between the plane of the inner retaining lip 110 and the plane of the outer flange 114 and seals around the circumference of the plug 78. The plug 78 seals the vacuum filter bag 50 inlet opening 74 and prevents the contents of the filter bag 50 from escaping into the surrounding area. The gasket 70 is held between the plug inner retaining lip 110 and the outer flange 114 in the circumferential space 118 so that the plug 78 cannot be easily removed from the gasket 70.

It is appreciated that the overall dimensions of the inlet flange 62, gasket 70, and plug 78 may change depending on the size of the vacuum bag 50 and the size of the vacuum canister inlet 34.

Figure 4:
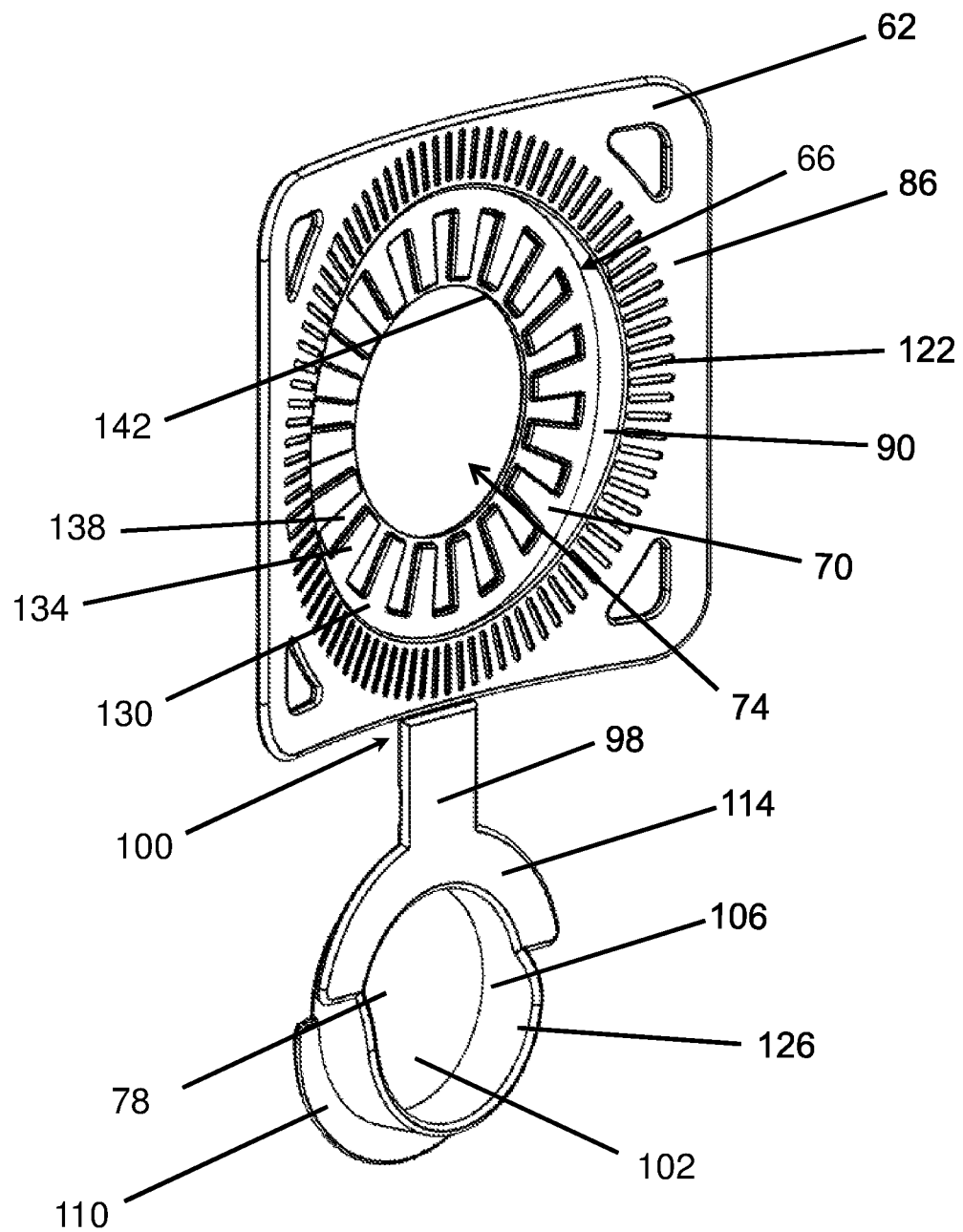
FIG. 4 is a perspective view drawing of the filter bag inlet flange.

FIG. 4 shows a drawing of the back (inside) side of the inlet flange 62. For clarity in illustrating the inlet flange 62, the front layer 54 and back layer 58 of filter material are not shown. The back of the mounting base 86 may be formed with a series of grooves 122 around the gasket opening 66. The grooves 122 may receive adhesive used in bonding the inlet flange 62 to the front layer 54 of filter material to improve the bonding of the mounting base 86 to the front layer 54 of the filter bag filter media. Often, the mounting base 86 is attached to the front layer 54 of the filter bag 50 by adhesive, ultrasonic welding, or by thermal fusion and the indentions 122 improve this bonding. The front layer 54 of the filter bag 50 includes an opening formed therein to allow the canister inlet 34 to pass into the interior cavity of the filter bag 50 and deposit debris into the filter bag 50. This front layer opening is typically a round opening which aligned coaxially with the inlet flange opening 66 and inlet opening 74. The front layer opening is typically about the same diameter as the inlet flange opening 66 or slightly smaller than the inlet flange opening 66 and is typically larger in diameter than the inlet gasket opening 74

The sidewall 106 of the plug 78 includes a distal outer extension 126 which is formed on the distal end of the plug sidewall 106 and which extends beyond the outer flange 114. The outer extension 126 of the plug sidewall 106 extends beyond the plane of the outer flange 114 to a distance of about 3 times the thickness of the inlet gasket 70 or more. The outer extension 126 of the plug 78 extends rearwardly relative to the inlet flange 62 when the plug 78 is in the unused position shown in FIGS. 3 and 4. When the plug 78 is inserted into the inlet gasket 70 to close the filter bag 50, the outer extension 126 is located on the outside of the filter bag 50 and extends outwardly away from the inlet gasket 70. The outer extension 126 helps prevent the plug 78 being inserted through the inlet gasket 70 to such a distance as to cause the sidewall 106 of the plug 78 to pass completely through the inlet gasket 70 and create an opening at the filter inlet opening 74.

The inlet gasket 70 is formed with several surface features of differing thickness which improve the seal formed between the inlet gasket 70 and the vacuum canister inlet 34 and which help prevent accidental removal of the inlet gasket 70 from the vacuum canister inlet 34. These features are such that the inlet gasket 70 includes thick portions and thin portions. The thick portions of the inlet gasket 70 are approximately twice as thick as the thin portions of the inlet gasket 70. In one example, the thick portions of the inlet gasket 70 are approximately 0.1 inches thick and the thin portions of the inlet gasket 70 are approximately 0.05 inches thick.

The outer circumference of the inlet gasket 70 is attached to an attachment flange 94 formed around the opening 66 in the mounting base 86. The inlet gasket 70 may be co-molded with the mounting base 86. The inlet gasket 70 includes a thick circumferential band 130 which extends around the outer portion of the inlet gasket 70. The circumferential band 130 is annular in shape and is approximately 0.1 inches thick and approximately 0.15 inches wide. The inlet gasket 70 includes radial ribs 134 which are connected to the outer circumferential band 130 and which extend inwardly towards the inlet opening 74 from the outer circumferential band 130. The radial ribs 134 are approximately 0.1 inches thick and are approximately 0.15 inches wide at their outer ends (adjacent the circumferential band 130) and approximately 0.1 inches wide at their inner ends (adjacent the inlet opening 74). The radial ribs 134 are separated by radial recesses 138. The inlet gasket 70 is approximately 0.05 inches thick at the radial recesses 138 and the radial recesses 138 are approximately 0.15 inches wide adjacent the circumferential band 130 and approximately 0.1 inches wide adjacent the inlet opening 74. In the example gasket 70, there are 18 radial ribs 134 and 18 recesses 138 between radial ribs 134. The inlet gasket 70 also includes an inner circumferential band 142 which is disposed adjacent the inner ends of the radial ribs 134. The inner circumferential band 142 is of uniform thickness and is thinner than the radial ribs 134. The example inner circumferential band 142 is annular in shape and is approximately 0.05 inches thick and approximately 0.05 inches wide.

The outside face of the inlet gasket 70 is flat while the inside face of the inlet gasket 70 is of varying depth as it presents the varied surface of the ribs, recesses, and bands included as part of the inlet gasket 70. The various features of the inlet gasket 70 improve the seal between the inlet gasket 70 and the canister inlet 34 and also help keep the inlet gasket 70 from moving off of the canister inlet 34 during use and transport of the vacuum 10.

Figure 5:
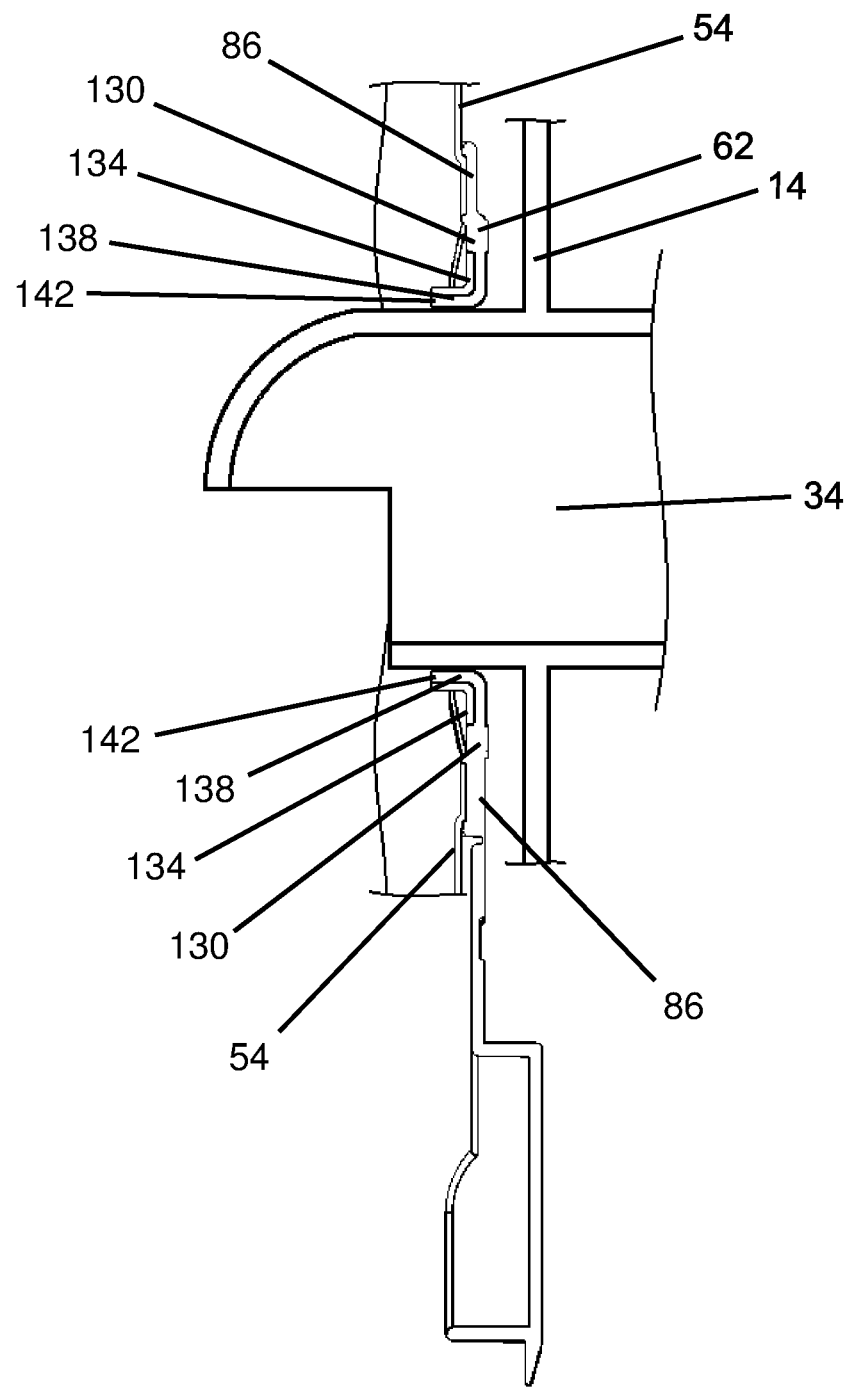
FIG. 5 is a side view schematic drawing of the filter bag inlet flange and vacuum inlet port.

FIG. 5 shows a cross-sectional drawing of the vacuum filter bag 50 installed in a canister vacuum 10. For clarity in showing the filter gasket, a close view of the inlet flange 62 and surrounding structures is shown. When the vacuum filter bag 50 is installed onto the canister inlet 34, the inlet gasket 70 stretches around the canister inlet 34 because the filter inlet opening 74 is smaller in diameter than the canister inlet 34. The stretching of the inlet gasket 70 and its movement onto the canister inlet 34 cause the inlet gasket to roll inwardly towards the interior of the vacuum filter bag 50. The flat outside face of the filter gasket 70 contacts the exterior of the canister inlet 34 and seals against the canister inlet 34. For many vacuums, approximately the inner one third of the diametrical width of the inlet gasket 70 is folded against the vacuum canister inlet 34. Commonly, between about one fourth and about one half of the diametrical width of the inlet gasket 70 is folded against the canister inlet 34.

The thinner recesses 138 disposed between the thicker ribs 134 stretch more easily than the thicker ribs 134 and allow the inlet gasket to stretch significantly to fit over the canister inlet 34. Accordingly, the inlet gasket can accommodate variation in the diameter of the canister inlet 34 while still creating a good seal. The thicker ribs 134 resist stretching or axial compression and cause the inlet gasket 70 to bend inwardly along the canister inlet 34 towards the interior of the filter bag 50. The thicker outer circumferential band 130 provides stiffness to the thicker axial ribs 134 and holds the outer portion of the ribs 134 in an axial direction.

These inlet gasket features cause the inlet gasket 70 to fold inwardly such that the outer face of the inlet gasket 70 primarily contacts the vacuum canister inlet 34 instead of the inner circumferential surface of the inlet opening 74 contacting the canister inlet 34. This provides a larger area where the inlet gasket 70 is contacting the canister inlet 34. The outer circumferential band 130 tends to stiffen the thicker axial ribs 134 and hold the base of the axial ribs 134 in an axial position pointing towards the canister inlet 34. The thickness and stiffness of the thicker axial ribs 134 combined with the adjacent thinner recesses 138 located between the ribs causes the thicker axial ribs 134 to bend instead of stretching while the inlet gasket 70 stretches in the thinner axial recesses 138. This causes the inlet gasket to bend inwardly and extend along a length of the canister inlet 34. The thin recesses 138 allow the inlet gasket 70 to stretch and be installed over a canister inlet 34 with relative ease.

The inner circumferential band 142 provides an area of uniform thickness at the inner circumference of the inlet gasket 70. This provides uniform sealing against the surface of the canister inlet 34. The inner circumferential band 142 also provides a uniform edge to the section of the inlet gasket which will be stretched. The inner circumferential band 142 helps to reduce stress risers in the gasket inlet opening 74 and helps to prevent tearing of the inlet gasket 70 due to stretching. The inlet gasket 70 is capable of stretching and sealing well for a wide range of diameters of canister inlets 34. The inlet gasket 70 causes a large section of inlet gasket to fold inwardly and engage the canister inlet 34 to seal against the canister inlet 34. Flat gaskets, in comparison, stretch diametrically and remain generally in the plane of the associated filter flange after installation.

Figure 6:
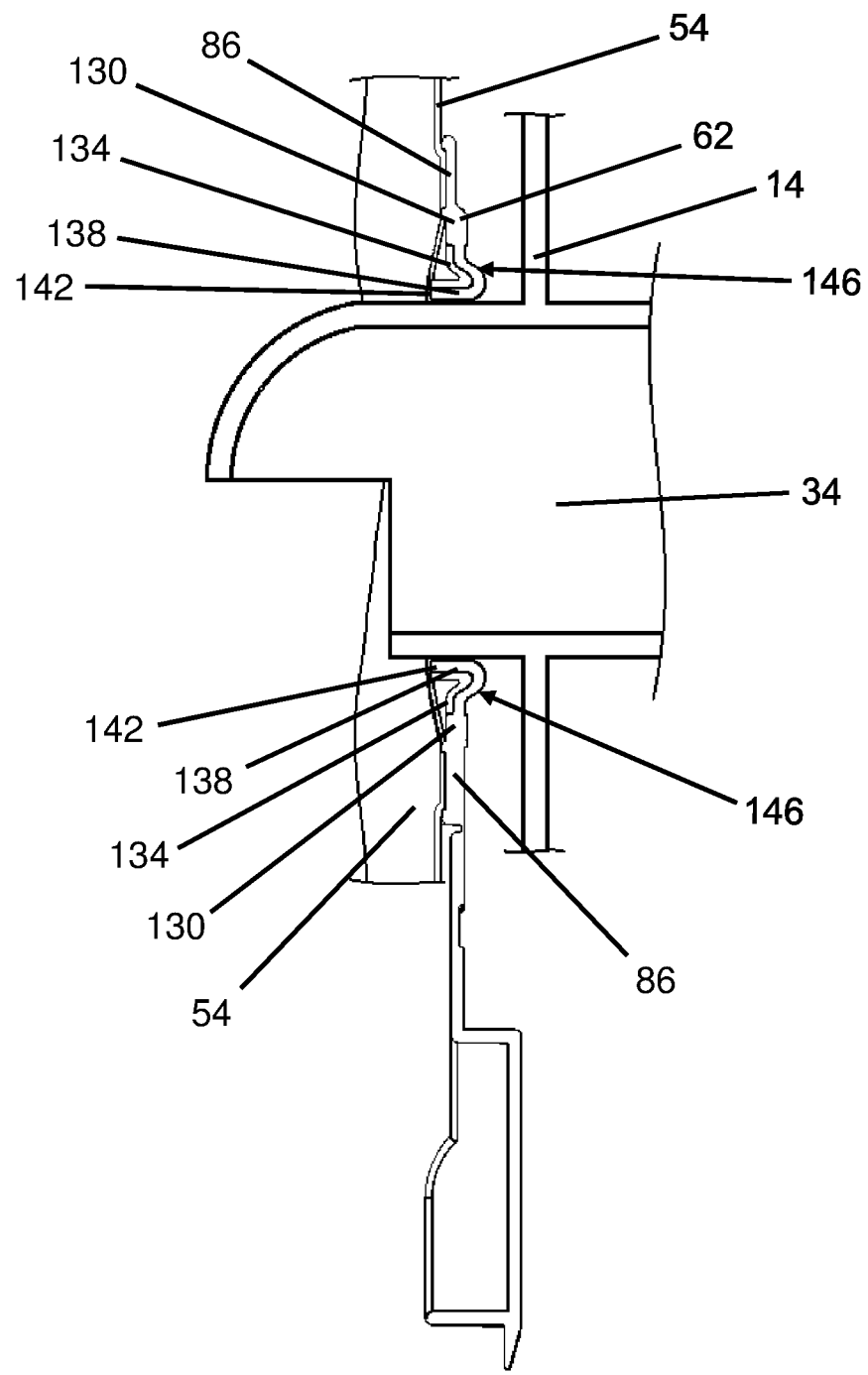
FIG. 6 is a side view schematic drawing of the filter bag inlet flange and vacuum inlet port.

The inlet gasket surface features also help secure the inlet gasket 70 to the canister inlet 34. FIG. 6 shows a cross-sectional drawing of the vacuum filter bag 50 installed in a canister vacuum 10 during removal or movement of the filter bag 50. The portion of the filter gasket 70 which is folded against the canister inlet 34 grips the canister inlet 34 and does not easily slide off of the canister inlet 34. As the filter inlet flange 62 is moved away from the canister wall and off of the canister inlet 34, the portion of the inlet gasket which is folded against the canister inlet 34 remains in place while the portion of the inlet gasket 70 which is in the plane of the inlet flange 62 bends back over itself at the location indicated at 146. The thicker axial ribs 134 tend to unbend and urge the inlet flange 62 back towards the wall of the canister 14 into the installed position shown in FIG. 5. In order to remove the vacuum filter 50 from the canister inlet 34, the inlet flange 62 must generally be moved to a position adjacent to the gasket inner circumferential band 142 or beyond before the inlet gasket 70 slides off of the canister inlet 34 or before the folded portion of the inlet gasket inverts and moves off of the canister inlet 34.

The filter inlet gasket 70 is advantageous in that it will stretch and slide over the canister inlet 34 with relative ease and provides an excellent seal against the canister inlet 34 once installed. After installation, the inlet gasket 70 is more difficult to remove from the canister inlet 34 and provides a large engagement area between the inlet gasket 70 and the canister inlet 34 which helps prevent the inlet gasket 70 from sliding off of the canister inlet 34. The inlet gasket 70 biases the inlet flange 62 into the installed position shown in FIG. 5 and resists removal from the canister inlet 34. Back and forth movement of known filter bag gaskets along a vacuum inlet tends to gradually move the filter bag gasket off of the vacuum inlet. In contrast, the inlet gasket 70 resists back and forth movement of the inlet flange 62 and biases the inlet flange into the installed position until the inlet gasket is completely removed from the canister inlet 34. This resistance to removal of the inlet gasket 70 from the canister inlet 34 is beneficial as it helps prevent accidental disconnection of the filter bag 50 due to the weight of debris in the filter bag 50 or movement of the vacuum 10.

Figure 7:
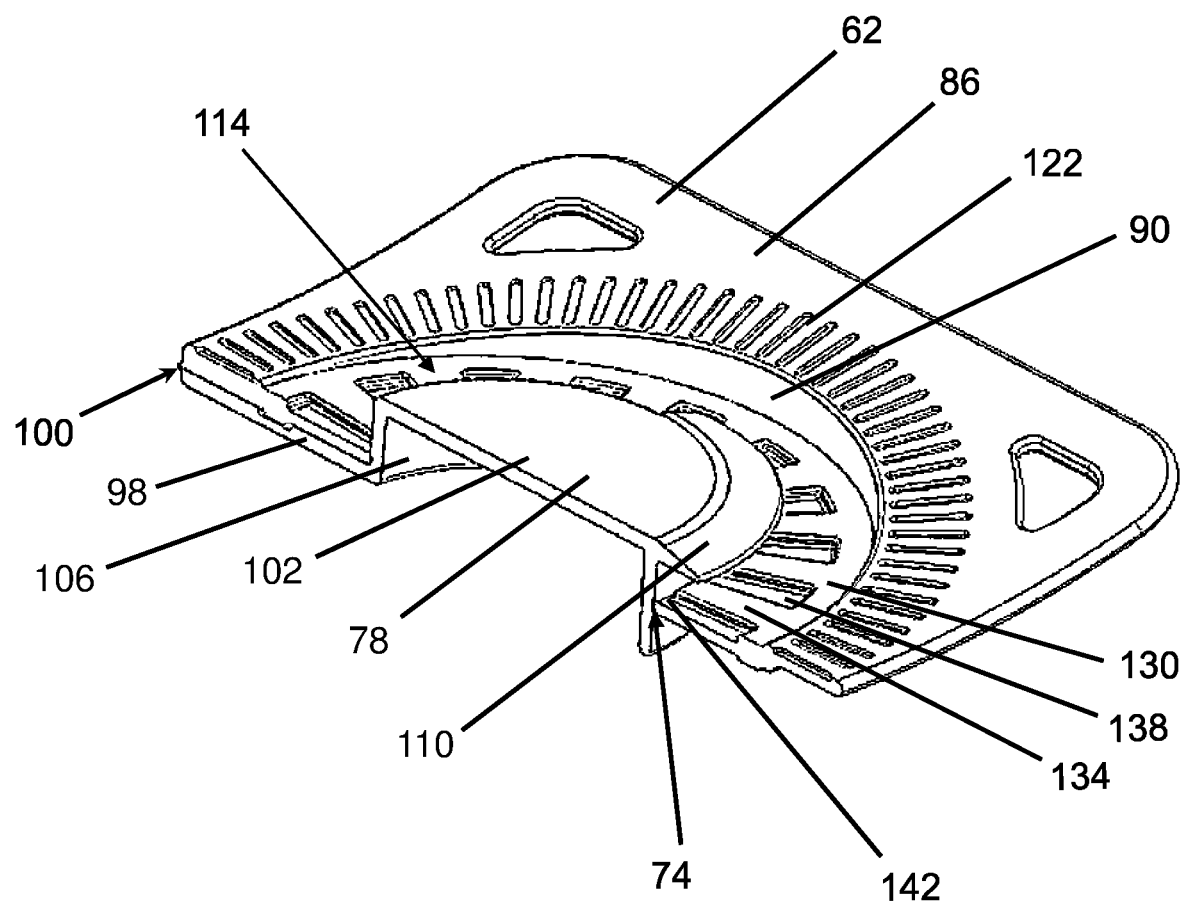
FIG. 7 is a cut away perspective drawing of the filter bag inlet flange.

FIG. 7 shows a cross-sectional drawing of the inlet flange 62 after the plug 78 has been used to close the vacuum bag. For clarity in showing the inlet flange, the front layer 54 and rear layer 58 of filter media are not shown. After the filter bag 50 has been filled with debris, the filter bag 50 is disconnected from the vacuum by removing the inlet gasket 70 from the canister inlet 34. As shown in FIG. 6, this typically bends the inlet gasket 70 back over the portion of the inlet gasket 70 which engages the canister inlet 34 and requires more effort than initially installing the filter bag 50 onto the vacuum 10. Once the inlet flange 62 is removed from the canister inlet 34, there is typically enough space to close the filter bag inlet 74 before removing the filter bag 50 from the vacuum canister 14. To close the filter bag 50, the plug 78 is pivoted upwards towards the filter inlet opening 74. The strap 98 bends more easily at the groove 100, naturally moving the plug 78 into alignment with the filter inlet opening 74.

When the plug 78 is moved to a position in front of the filter inlet opening 74, the inner retention lip 110 is disposed towards the inlet opening 74 relative to the length of the plug 78 and the outer flange 114 is disposed away from the inlet opening 74 relative to the length of the plug 78. The plug 78 is pressed towards the filter inlet opening 74 to cause the inner retention lip 110 to move through the inlet opening 74. As the plug enters the filter inlet opening 74, the outer flange 114 contacts the outside face of the inlet gasket 70 and prevents the plug 78 from moving completely through the inlet opening 74.

When the plug 78 is properly seated in the filter inlet opening 74, the inner retention lip 110 is disposed completely in the interior cavity 82 of the filter bag 50 and is disposed adjacent the inner face of the inlet gasket 70. The plug outer flange 114 is outside of the filter bag 50 and is disposed adjacent the outer face of the inlet gasket 70. The inlet gasket 70 is disposed in the circumferential space 118 along the outer sidewall 106 of the plug 78 between the inner retention lip 110 and the outer flange 114. The outside diameter of the plug sidewall 106 is larger than the inner diameter of the filter inlet opening 74. Accordingly, the inner circumferential band 142 or inner circumference of the inlet opening 74 is stretched and held against the plug 78 by the stretching of the elastomeric material. The inner circumferential band 142 seals well against the plug 78. Once the plug 78 is inserted into the filter opening 74 to close the filter bag 50, it is relatively difficult to remove from the inlet opening 74 and the plug 78 is unlikely to be accidentally removed from inlet opening 74. The filter bag 50 is sealed closed with little risk of leaking and minimum exposure to the contents of the filter bag 50.

For use with ordinary debris, the improvements in sealing between the inlet gasket 70 and vacuum inlet 34 and in sealing the filter bag 50 for disposal increase the cleanliness of the filter bag and minimize exposure to the dust. For industrial use with hazardous material, these improvements allow the filter bag 50 to meet requirements regarding the containment of hazardous debris and prevent more serious dust exposure for workers using the filter bag.

Figure 8:
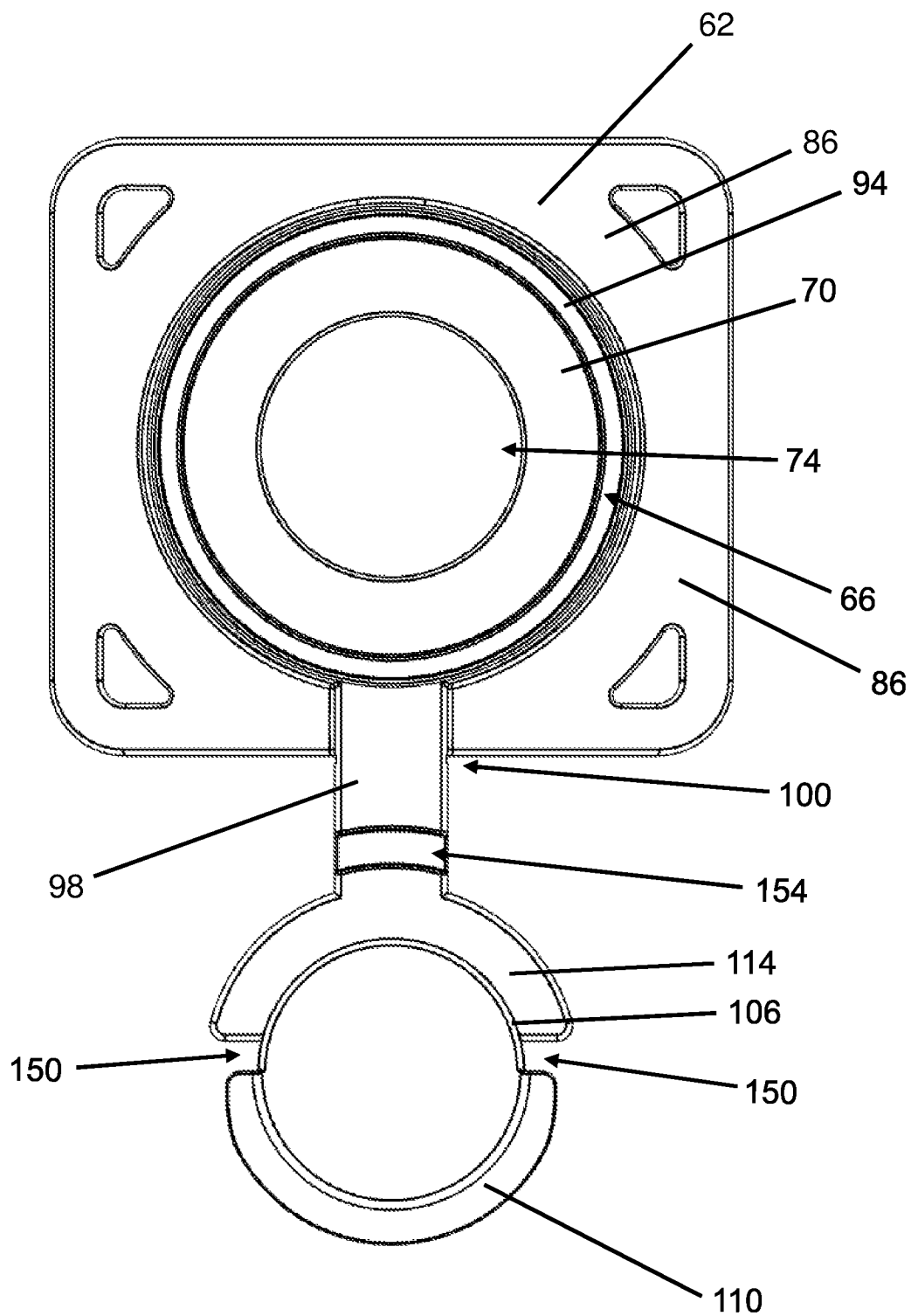
FIG. 8 is a front view drawing of the filter bag inlet flange.

FIG. 8 shows a front view of the inlet flange 62. For clarity, the filter media is not shown. FIG. 8 illustrates how there may be circumferential gaps 150 between the ends of the distal retention lip 110 and the proximal circumferential flange 114. These gaps 150 may help ensure that the plug 78 is not passed through the inlet opening 74 and too far into the filter bag 50 and may also ease molding of the inlet flange. Additionally, it can be seen how the inner retention lip 110 and outer circumferential flange 114 may be formed with rounded corners. Rounded corners on the inner retention lip reduce the chance of damaging the inlet gasket 70 while closing the filter bag 50 with the plug 78. The strap 98 may include a groove 154 corresponding to the edge of the cylindrical wall 90, if necessary, to allow the plug 78 to fully seat in the inlet gasket 70.

Figure 9:
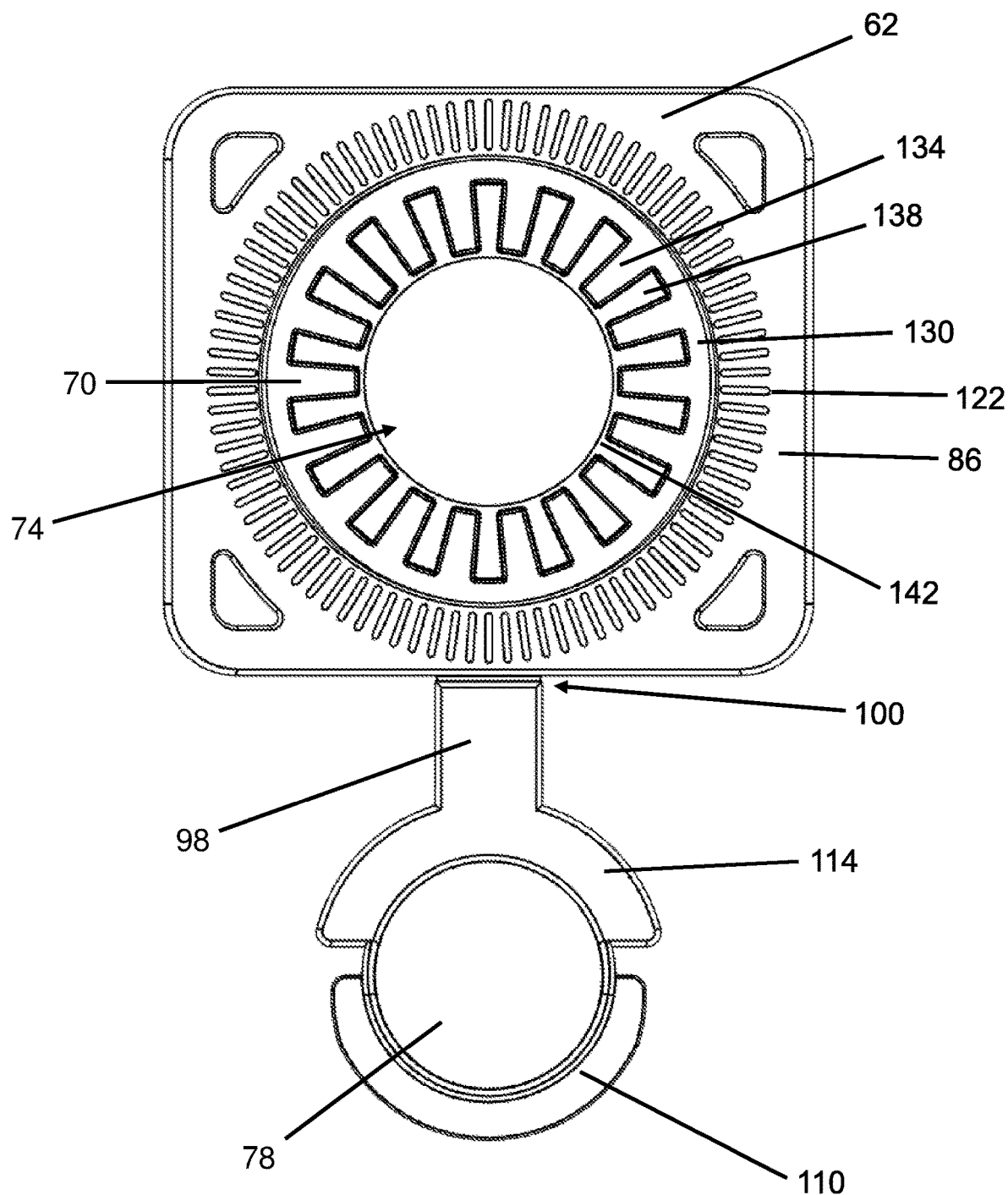
FIG. 9 is a back view drawing of the filter bag inlet flange.

FIG. 9 shows a back view of the inlet flange 62. For clarity, the filter media is not shown. The size and positioning of the inner circumferential band 130, the thick axial ribs 134, the axial recesses 138, and inner circumferential band 142 are more easily seen.

Figure 10:
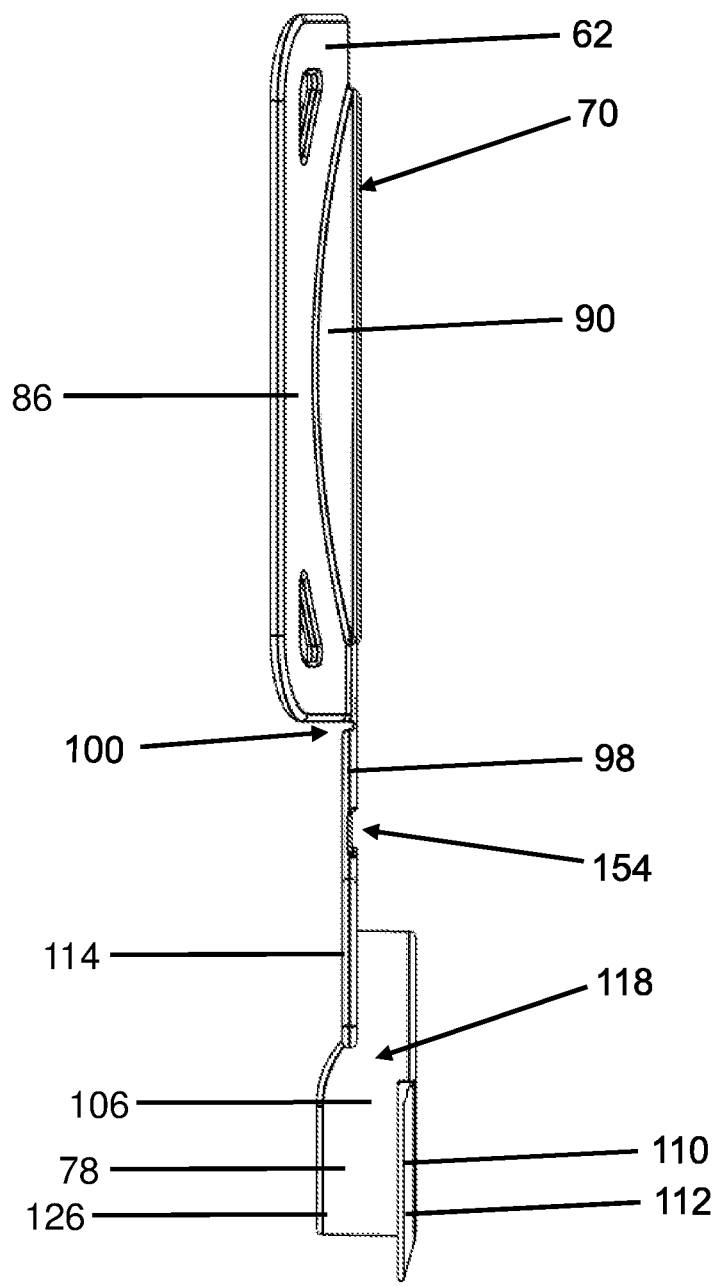
FIG. 10 is a side view drawing of the filter bag inlet flange.

FIG. 10 shows a side view of the inlet flange 62. For clarity, the filter media is not shown. The side view more clearly illustrates the cylindrical sidewall 106 of the plug and shows how there is a circumferential gap between the plane of the inner retention lip 110 and the plane of the outer circumferential flange 114. The opposite side of the inlet flange 62 is a mirror image of the side which is shown.

Figure 11:
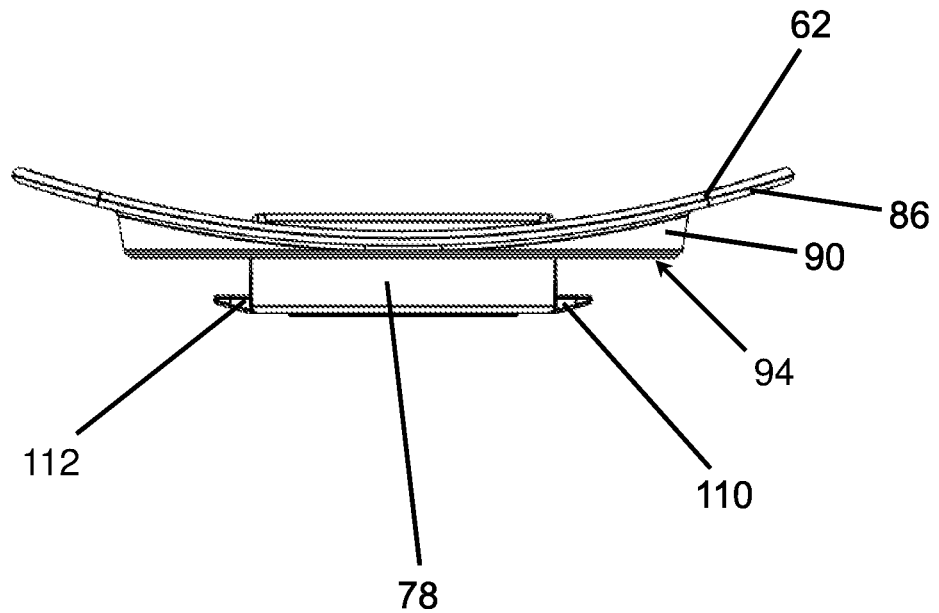
FIG. 11 is a top view drawing of the filter bag inlet flange.

FIG. 11 shows a top view of the inlet flange 62. For clarity, the filter media is not shown. The top view illustrates the curvature of the mounting base 86 and the cylindrical wall 90 which extends from the mounting base and provides a planar attachment flange 94 for the inlet gasket 70.

Figure 12:
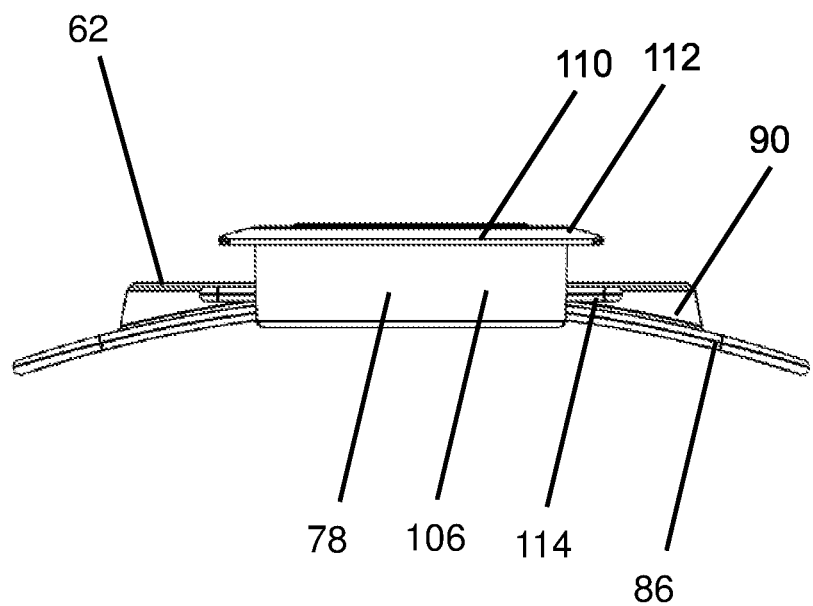
FIG. 12 is a bottom view drawing of the filter bag inlet flange.

FIG. 12 shows a bottom view of the inlet flange 62. For clarity, the filter media is not shown. The bottom view illustrates the planar separation between the inner retention lip 110 and the outer flange 114.

The filter bag inlet flange 62 reduces the risk of exposure to dust while using and disposing of the filter bag 50. The inlet gasket 70 provides an improved seal with the vacuum canister inlet 34. The inlet gasket 70 better resists applied forces and movement of the vacuum which might otherwise disconnect a filter bag from the vacuum. The plug 78 creates a reliable seal with the inlet gasket for disposal of the filter bag 50 and prevents exposure to the bag contents while removing and disposing the filter bag 50.

The above description of illustrated examples of the present invention, including what is described in the Abstract, is not intended to be exhaustive or to be limiting to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:
1. A vacuum filter bag comprising:
   a filter bag comprising an enclosed interior space to receive debris therein;
   wherein the filter bag comprises filter media to filter debris from a fluid passing therethrough;
   an opening in the filter bag;
   an inlet flange attached to the filter bag at the opening;
   an inlet gasket attached to the inlet flange, wherein the inlet gasket defines a filter inlet opening, and wherein dust and debris enters into the filter interior space through the filter inlet opening;

wherein the filter inlet gasket comprises thick ribs having a width and a thickness disposed around the inlet opening and oriented towards the inlet opening, and;

wherein the filter inlet gasket comprises thin recesses disposed between the thick ribs in an alternating arrangement, the recesses comprising a section of inlet gasket material disposed between the ribs having a width and a thickness, and wherein the thickness of the inlet gasket at the recesses is less than the thickness of the inlet gasket at the ribs.

2. The vacuum filter of claim 1, wherein, on an exterior face of the inlet gasket, an annular band surrounding the inlet opening is flat.

3. The vacuum filter of claim 2, wherein, when the vacuum filter bag is installed onto a vacuum inlet port, the flat annular band surrounding the inlet opening on the exterior face of the inlet gasket is folded inwardly and is disposed generally coaxial with the inlet port such that the flat annular band contacts the vacuum inlet port and seals against the inlet port.

4. The vacuum filter of claim 1, wherein the inlet gasket comprises a thick outer circumferential band and wherein the thick ribs connect to the outer circumferential band and extend inwardly therefrom towards the inlet opening.

5. The vacuum filter of claim 4, wherein an outer face of the inlet gasket is generally flat, and wherein the outer circumferential band and the thick ribs create variation in the surface of an interior face of the inlet gasket.

6. The vacuum filter of claim 1, wherein the inlet gasket comprises an inner circumferential band of uniform thickness which is disposed between the filter inlet opening and inner ends of the thick ribs.

7. The vacuum filter of claim 1, further comprising a plug attached to the inlet flange, wherein the plug may be inserted into the inlet opening to close the filter inlet opening, wherein the plug comprises an inner retention lip which is inserted through the filter inlet opening and an outer flange which is not inserted through the filter inlet opening such that the filter inlet gasket is disposed between the inner retention lip and the outer flange when the plug is used to close the filter inlet opening.

8. The vacuum filter of claim 7, wherein the inner retention lip is disposed in a first plane, wherein the outer flange is disposed in a second plane parallel to the first plane, and wherein the plug comprises a space between the first plane and the second plane.

9. A vacuum filter bag comprising:
a filter bag comprising an enclosed interior space to receive debris therein;
wherein the filter bag comprises filter media to filter debris from a fluid passing therethrough;
an opening in the filter bag;
an inlet flange attached to the filter bag at the opening;
an inlet gasket attached to the inlet flange, wherein the inlet gasket defines a filter inlet opening, and wherein dust and debris enters into the filter interior space through the filter inlet opening;
a plug attached to the inlet flange, wherein the plug may be inserted into the inlet opening to close the filter inlet opening, wherein the plug comprises a plug body with a shape that corresponds to the inlet gasket filter inlet opening so as to enable the plug to seal the filter inlet opening, an inner retention lip which extends outwardly from the plug body, and an outer flange which extends outwardly from the plug body, and wherein, when the plug is disposed in the inlet gasket to close the filter inlet opening, the inner retention lip is located inside of the filter inlet gasket adjacent the inside of the filter inlet gasket and the outer flange is located outside of the filter inlet gasket adjacent the outside of the filter inlet gasket such that the filter inlet gasket is disposed between the inner retention lip and the outer flange.

10. The vacuum filter of claim 9, wherein the inner retention lip is disposed in a first plane, wherein the outer flange is disposed in a second plane parallel to the first plane, and wherein the plug comprises a space between the first plane and the second plane.

11. The vacuum filter of claim 9, wherein the filter bag comprises a front layer of material, a back layer of material which is attached to the front layer of filter media to form the enclosed interior space, and wherein at least one of the front later and the back layer comprises the filter media.

12. The vacuum filter of claim 9, wherein the filter inlet gasket comprises ribs disposed around the inlet opening and oriented towards the inlet opening and recesses disposed between the ribs in an alternating arrangement, and wherein the ribs have a thickness which is greater than a thickness of the recesses.

13. The vacuum filter of claim 12, wherein, on an exterior face of the inlet gasket, an annular band surrounding the inlet opening is flat.

14. The vacuum filter of claim 12, wherein the inlet gasket comprises an outer circumferential band, wherein the outer circumferential band has a thickness which is greater than the thickness of the recesses, and wherein the ribs connect to the outer circumferential band and extend inwardly therefrom.

15. The vacuum filter of claim 14, wherein an outer face of the inlet gasket is generally flat, and wherein the outer circumferential band and the ribs create variation in the surface of an interior face of the inlet gasket.

16. A vacuum filter bag comprising:
a filter bag comprising an enclosed interior space to receive debris therein;
wherein the filter bag comprises filter media to filter debris from a fluid passing therethrough;
an opening in the filter bag;
an inlet flange attached to the filter bag at the opening;
an inlet gasket attached to the inlet flange, wherein the inlet gasket defines a filter inlet opening, and wherein dust and debris enters into the filter interior space through the filter inlet opening;
wherein the filter inlet gasket comprises an alternating arrangement of ribs and recesses disposed around the inlet opening and oriented towards the inlet opening, wherein the ribs have a width and a thickness, wherein each of the recesses comprises a section of inlet gasket material having a width and a thickness, wherein a face of the inlet gasket is of varying depth across the surface of the ribs and recesses.

17. The vacuum filter of claim 16, wherein, on an exterior face of the inlet gasket, an annular band surrounding the inlet opening is flat.

18. The vacuum filter of claim 16, wherein the thickness of the ribs is greater than the thickness of the recesses.

19. The vacuum filter of claim 16, wherein the inlet gasket comprises an outer circumferential band, wherein the outer circumferential band has a thickness which is greater than a thickness of recesses disposed between the ribs, and wherein the ribs connect to the outer circumferential band and extend inwardly therefrom.

20. The vacuum filter of claim 16, wherein an outer face of the inlet gasket is generally flat, and wherein the ribs create variation in the surface of an interior face of the inlet gasket.

* * * * *